United States Patent [19]

Delabie

[11] 4,394,531
[45] Jul. 19, 1983

[54] TRANSMISSION LINE ASSEMBLY INCLUDING MEANS FOR REDUCING VIBRATIONS AND METHOD OF MAKING SAME

[75] Inventor: Jacques J. A. Delabie, Bonneuil sur Marne, France

[73] Assignee: Societe Nationale d'Etude et de Construction de Moteurs d'Aviation, "S.N.E.C.M.A.", Paris, France

[21] Appl. No.: 212,127

[22] Filed: Dec. 2, 1980

[30] Foreign Application Priority Data

Dec. 3, 1979 [FR] France .................................. 79 29922

[51] Int. Cl.³ .................... H01B 7/18; H02G 7/14; F16L 57/00
[52] U.S. Cl. ..................................... 174/24; 138/114; 156/52; 156/86; 174/28; 174/42; 174/DIG. 8
[58] Field of Search ................ 174/24, 28, 42, 101.5, 174/113 AS, 136, DIG. 8, 70 A; 138/108, 112, 114; 29/433, 447, 828; 156/47, 48, 51, 52, 86; 350/96.23

[56] References Cited

U.S. PATENT DOCUMENTS 2,760,228  8/1956  Verges .............................. 174/28 X
4,194,750  3/1980  Sovish et al. ............. 174/DIG. 8 X

FOREIGN PATENT DOCUMENTS 761000  12/1933  France .................................. 174/28
52-54454  5/1977  Japan ............................. 350/96.23
165676  3/1934  Switzerland ......................... 174/28
705614  3/1954  United Kingdom ................. 174/28

Primary Examiner—Laramie E. Askin
Attorney, Agent, or Firm—Oblon, Fisher, Spivak, McClelland & Maier

[57] ABSTRACT

A transmission line assembly including a mechanism for reducing vibrations and a method of making the same is provided which includes an outer tubular sheath having an inner surface forming an inner diameter, an inner tubular wall member firmly frictionally fixed to the inner surface of the outer tubular sheath, a transmission line disposed within the inner tubular wall for transmitting energy, a plurality of radially contracted tubular sections having axial lengths at regularly spaced axial intervals formed in the inner tubular wall member and contiguously surrounding the transmission line for protecting, centering and supporting the transmission line within the outer tubular sheath and a plurality of radially enlarged sections formed in the inner tubular wall member having axial lengths greater than the axial lengths of the radially contracted tubular sections and having outer diameters radially compressed by the outer tubular sheath.

12 Claims, 1 Drawing Figure

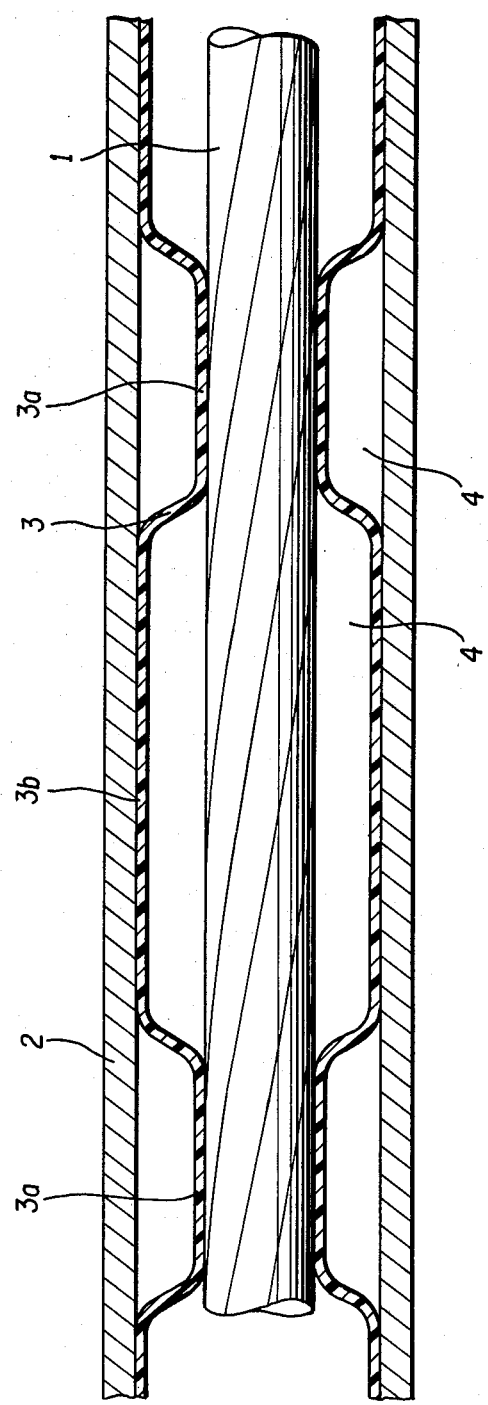

TRANSMISSION LINE ASSEMBLY INCLUDING MEANS FOR REDUCING VIBRATIONS AND METHOD OF MAKING SAME

BACKGROUND OF THE INVENTION

Field of the Invention

This invention concerns a protective device for a line such as an electrical transmission line, a manufacturing process for same, and a transmission line provided with such a device.

SUMMARY OF THE INVENTION

The principal object of the invention is to provide a transmission line with a device which provides effective protection against vibration, wear from abrasion, piezoelectrical phenomena or mechanical shocks.

This object is achieved in conformity with the invention by the fact that the line protection device includes an outside sheath which is tubular in shape and surrounds the line, this sheath being kept separate from the line by an interior tubular wall member which features, at regular intervals, contracted sections which contiguously surround the line and longer sections which are mounted so as to rub against the sheath.

Advantageously, the sheath and/or the interior wall member are made of a plastic material, the interior wall member is made of a thermo-retractable plastic material, and the interior wall member delimits, with the outside sheath, an annular gas-filled sealed chamber at the level of each contracted section. Moreover, preferably, the interior wall member delimits, with the line, an annular gas-filled sealed chamber at the level of each longer section, the line is flexible or semiflexible, and the line is an electrical wire or a bundle of electrical wires.

The protective device, which is simple in design and can be manufactured inexpensively, is thus capable of dampening violent shocks and vibrations which threaten to cause a break in the line.

This protective device is manufactured to best advantage by means of a procedure according to which the line is inserted into a tube of thermoretractable plastic material, whose inside diameter is greater than the outside diameter of the line, whereafter the tube is heated at regular intervals to produce contracted sections which contiguously surround the line, and the line thus fitted with the shaped tubular wall member is inserted into a tubular sheath whose inside diameter may be very slightly greater than, or very slightly smaller than, the outside diameter of the uncontracted sections of the tubular wall member.

BRIEF DESCRIPTION OF THE DRAWING

Other characteristics and advantages of the invention will emerge from the following description of one mode of manufacture, illustrated by the attached drawing in which:

The sole FIGURE is a lengthwise view in axial cross-section of an electrical cable according to one mode of manufacture of the invention.

DETAILED DESCRIPTION OF THE PREFERRED EMBODIMENT

The cable represented consists of an electrical wire 1 protected and electrically insulated along its entire length by a device surrounding the wire 1 and including an external flexible or semiflexible sheath 2 which is tubular in shape, and an inside flexible or semiflexible wall member 3, also tubular but featuring, at regular intervals, contracted tubular sections 3a which contiguously surround the wire 1. Between the contracted sections 3a are larger-diameter tubular sections 3b, whose outside diameters are, before the wall member 3 is mounted inside the sheath 2, very slightly greater than the inside diameter of said sheath 2.

In this manner the interior wall member 3, with the wire 1 and the sheath 2, delimits a series of annular gas-filled chambers 4 (filled with air, for example), which constitute one of the shock absorbing or vibration absorbing elements with respect to the sheath 2. The chambers 4 are most advantageously sealed to prevent passage of the gas they contain.

The wall member 3 is preferably made of a thermoretractable thermoplastic such as polyethylene, polytetrafluoroethylene (marketed under the name "Teflon"), fluoropropylene fluoride of vinylidene (marketed under the name "Viton"), polychloroprene (marketed under the name of neoprene), polyfluoride of vinylidene (marketed under the name "Kynar"), the polyolefines, etc. The sheath 2 is made of an electrically insulating or noninsulating material which has good resistance to corrosion, such as plastic sheaths or tubes or stainless steel sheaths or tubes.

The cable just described may be manufactured in the following manner. First, the wire 1 is inserted into a tube 3 of the thermoretractable plastic. The tube 3 is then heated where it is intended to form the contracted sections 3a. The wire 1 with the wall member 3 thus shaped is then inserted into a sheath 2, the inside diameter of which is very slightly less than the outside diameter of the noncontracted sections 3b of the tube 3 for frictional engagement of sheath 2 and wall member 3 and such that tubular contracted sections 3a support said wire 1 so as to have a longitudinal axial orientation parallel to that of sheath 2 as clearly shown in the sole FIGURE.

The cable as just described is most advantageously used in applications which require an environment which is severe in terms of vibration and mechanical constraints, but nevertheless require high reliability. Such is the case of aeronautical equipment and principally of turbojet accessories.

The wire 1, which may be flexible or semiflexible, may be replaced by another type of line, for example a flexible or semiflexible fluid conduit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transmission line assembly including means for reducing transmission line vibration comprising:
    an outer tubular sheath having an inner surface forming an inner diameter;
    an inner tubular wall member firmly frictionally fixed to said inner surface of said outer tubular sheath;
    a transmission line disposed within said inner tubular wall member for transmitting energy;
    a plurality of radially contracted tubular sections having axial lengths at regularly spaced axial intervals formed in said inner tubular wall member and contiguously surrounding said transmission line for protecting, centering and supporting said transmission line within said outer tubular sheath; and a plurality of radially enlarged sections formed in said inner tubular wall member having axial lengths greater than the axial lengths of said radially contracted tubular sections and having outer diameters radially compressed by said outer tubular sheath.

2. An assembly according to claim 1 wherein said outer tubular sheath further comprises a plastic material.

3. An assembly according to claim 1 wherein said inner tubular wall member further comprises a plastic material.

4. An assembly according to claim 1 wherein said outer tubular sheath and said inner tubular wall member each further comprises a plastic material.

5. An assembly according to claims 1, 2, 3 or 4 wherein said inner tubular wall member further comprises a thermoretractable plastic material.

6. An assembly according to claim 1 wherein said inner tubular wall member and said outer tubular sheath form a plurality of sealed gas-filled annular chambers between said plurality of radially contracted tubular sections and said inner surface of said outer tubular sheath.

7. An assembly according to claim 1 wherein said inner tubular wall member and said transmission line form a plurality of sealed gas-filled annular chambers between said radially enlarged sections of said inner tubular wall member and said transmission line.

8. An assembly according to claim 1 wherein said transmission line further comprises a flexible transmission line.

9. An assembly according to claim 1 wherein said transmission line further comprises a semiflexible transmission line.

10. A transmission line assembly including means for reducing transmission line vibration comprising:

an outer tubular sheath having an inner surface forming an inner diameter;

an inner tubular wall member firmly fixed to said inner surface of said outer tubular sheath;

a transmission line disposed within said inner tubular wall member for transmitting energy;

a plurality of radially contracted tubular sections having axial lengths at regularly spaced axial intervals formed in said inner tubular wall member and contiguously surrounding said transmission line for protecting, centering and supporting said transmission line within said outer tubular sheath; and a plurality of radially enlarged sections formed in said inner tubular wall member having axial lengths greater than the axial lengths of said radially contracted tubular sections and having unstressed outer diameters smaller than said inner diameter of said outer tubular sheath.

11. A transmission line assembly as set forth in claims 1 or 10, wherein said tubular contracted section further comprises means for supporting said wire so as to have a longitudinal axis parallel to that of said sheath.

12. A method of manufacturing a transmission line assembly including means for reducing transmission line vibration, said assembly including a transmission line disposed within a thermoretractable plastic tube disposed within a tubular sheath, said transmission line having a smaller diameter than the inside diameter of said tube, wherein said method comprises:

inserting said transmission line into said tube;

heating said thermoretractable plastic tube at regular axial intervals so as to form a tubular wall member having tubular uncontracted sections and tubular contracted sections wherein said tubular contracted sections contiguously surround said transmission line; and inserting said transmission line fitted with said tubular wall member into said sheath, said sheath having an inside diameter substantially the same as the outside diameter of said uncontracted sections of said tubular wall member for friction fitting engagement therewith.

* * * * *